(12) United States Patent
Wang et al.

(10) Patent No.: US 10,219,547 B2
(45) Date of Patent: Mar. 5, 2019

(54) ATOMIZER COMPARTMENT STRUCTURE

(71) Applicant: Boulder (Shenzhen) Technologies, Inc., Shenzhen (CN)

(72) Inventors: Zeqi Wang, Guangdong (CN); Jinhua Chen, Guangdong (CN); Haiyuan Wang, Guangdong (CN)

(73) Assignee: Boulder (Shenzhen) Technologies, Inc., Shenzhen (CN)

( * ) Notice: Subject to any disclaimer, the term of this patent is extended or adjusted under 35 U.S.C. 154(b) by 0 days.

(21) Appl. No.: 15/683,794

(22) Filed: Aug. 23, 2017

(65) Prior Publication Data

US 2018/0255832 A1    Sep. 13, 2018

(30) Foreign Application Priority Data

Mar. 13, 2017    (CN) ..................... 2017 2 0244555 U

(51) Int. Cl.
| | |
|---|---|
| *A24F 47/00* | (2006.01) |
| *H01M 2/10* | (2006.01) |
| *H05B 3/06* | (2006.01) |
| *H05B 3/44* | (2006.01) |

(52) U.S. Cl.
CPC ........... *A24F 47/008* (2013.01); *H01M 2/105* (2013.01); *H05B 3/06* (2013.01); *H05B 3/44* (2013.01)

(58) Field of Classification Search
CPC ..................................................... A24F 47/008
See application file for complete search history.

(56) References Cited

U.S. PATENT DOCUMENTS

| | | | | |
|---|---|---|---|---|
| 2016/0183597 A1* | 6/2016 | Li | ......................... | H05B 1/0244 |
| | | | | 392/404 |
| 2016/0249684 A1* | 9/2016 | Liu | ........................ | A24F 47/008 |
| | | | | 131/328 |
| 2017/0079328 A1* | 3/2017 | Wu | ........................ | A24F 47/008 |
| 2017/0188633 A1* | 7/2017 | Force | .................... | A24F 47/008 |
| 2017/0295846 A1* | 10/2017 | Liu | ........................ | A24F 47/008 |

* cited by examiner

*Primary Examiner* — Eric Yaary

(57) ABSTRACT

An atomizer compartment structure includes an oil storage compartment and a heating core support. The upper end of the oil storage tank is a closed end, and the lower end of the oil storage tank has a tubular oil conduit and an air conduit, and the external wall of the oil storage compartment has a latch buckle disposed at an end near the air conduit. The upper end of the heating core support has an oil filling hole corresponsive to the oil conduit and an air guide hole corresponsive to the air conduit, and the external wall of the heating core support has an engaging slot for engaging the latch buckle. When the oil storage compartment and the heating core support are latched tightly, the oil conduit extends into the oil filling hole and the air conduit extends into the air guide hole.

8 Claims, 4 Drawing Sheets

ATOMIZER COMPARTMENT STRUCTURE

CROSS-REFERENCE TO RELATED APPLICATIONS

The present invention claims the benefit of Chinese Patent Application No. 201720244555.X, filed on Mar. 13, 2017; the contents of which are hereby incorporated by reference.

FIELD OF INVENTION

The present invention relates to the field of atomizer compartments, and more particularly to an atomizer compartment structure.

BACKGROUND OF INVENTION

1. Description of the Related Art

Electronic cigarette generally comes with an atomizer compartment structure comprising an oil storage compartment and a heating core support, and the oil storage compartment and heating core support are fixed by a thread tightening method, so that the oil storage compartment and heating core support are usually made of metal, and their production cost is relatively higher. In addition, it is necessary to unscrew the oil compartment in order to fill oil and then screw back the oil compartment tightly after oil filling. Obviously, such application is not convenient or fast enough. In addition, users have to be very careful while screwing back the oil compartment, or else oil may leak from the oil compartment.

2. Summary of the Invention

Therefore, it is a primary objective of the present invention to overcome the deficiency of the prior art by providing an atomizer compartment structure in accordance with the present invention.

To achieve the aforementioned and other objectives, the present invention provides an atomizer compartment structure comprising an oil storage compartment and a heating core support, wherein the upper end of the oil storage compartment is a closed end, and the lower end of the oil storage compartment has a tubular oil conduit and an air conduit, and the external wall of the oil storage compartment has a latch buckle disposed at an end near the air conduit, and the upper end of the heating core support has an oil filling hole configured to be corresponsive to the oil conduit and an air guide hole configured to be corresponsive to the air conduit, and the external wall of the heating core support has an engaging slot for engaging with the latch buckle tightly, such that when the oil storage compartment and the heating core support are engaged tightly, the oil conduit extends into the oil filling hole, and the air conduit extends into the air guide hole.

Preferably, the oil conduit has a ring-shaped slot formed on the external wall of the oil conduit, and a sealing sheathed on the ring-shaped slot. Preferably, the oil conduit comes with a quantity of two, and the air conduit comes with a quantity of one, and the two oil conduits are symmetrically distributed with respect to the air conduit. Preferably, the heating core support has a heating element installed transversally therein, and the heating element includes an oil guide cotton, and a heating wire sheathed on the oil guide cotton; and an end of the oil guide cotton is coupled to a pipe opening of an oil conduit, and the other end of the oil guide cotton is coupled to a pipe opening of another oil conduit. Preferably, the oil storage compartment has two latch buckles disposed on the external wall thereof, and the two latch buckles are symmetrically distributed with respect to the air conduit; and the external wall of the heating core support has two engaging slots symmetrically distributed with respect to the air guide hole.

In summation of the aforementioned technical solutions, the present invention has the beneficial effects of simple structure, low production cost, convenient removal, easy oil filling, good oil guide, effective oil leakage prevention, uniform atomization, and effective prevention of burning the oil guide cotton.

The above and other objects, features and advantages of this disclosure will become apparent from the following detailed description of the preferred embodiments taken with the accompanying drawings. It is noteworthy that the embodiments and figures disclosed herein are intended to be considered illustrative rather than restrictive.

DESCRIPTION OF THE PREFERRED EMBODIMENTS

Figure 1:
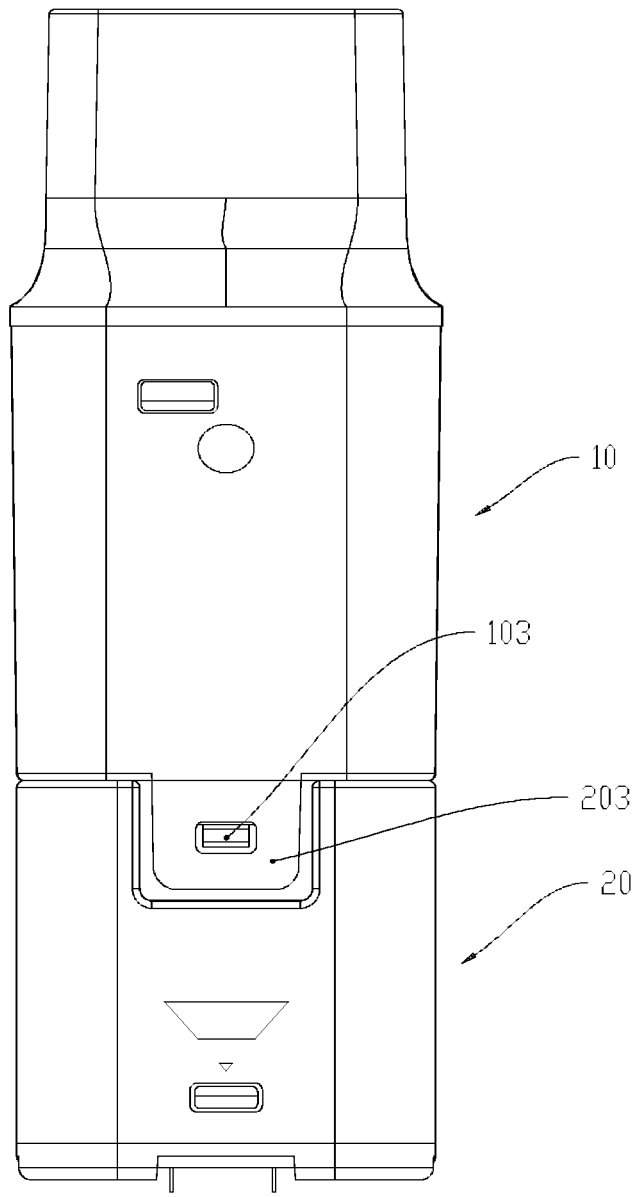
FIG. 1 is a perspective view of the present invention.

With reference to FIGS. 1 to 4 for an atomizer compartment structure of the present invention, the atomizer compartment structure comprises an oil storage compartment 10 and a heating core support 20, wherein the upper end of the oil storage compartment 10 is a closed end, and the lower end of the oil storage compartment 10 has a tubular oil conduit 101 and an air conduit 102, and the external wall of the oil storage compartment 10 has a latch buckle 103 disposed at an end near the air conduit 102; and the upper end of the heating core support 20 has an oil filling hole 201 configured to be corresponsive to the oil conduit 101 and an air guide hole 202 configured to be corresponsive to the air conduit 102, and the external wall of the heating core support 20 has an engaging slot 203 for tightly engaging the latch buckle 103. When the oil storage compartment 10 and the heating core support 20 are engaged tightly, the oil conduit 101 extends into the oil filling hole 201, and the air guide conduit 102 extends into the air guide hole 202. The oil storage compartment 10 and the heating core support 20 are fixed by a plug-and-unplug structure to facilitate the installation and removal of the oil storage compartment 10 and the heating core support 20, and the oil storage compartment 10 and the heating core support 20 are engaged tightly with the through the latch buckle and the engaging slot to achieve the effect of preventing any possible oil leakage and preventing components from being loosened or separated.

Figure 2:
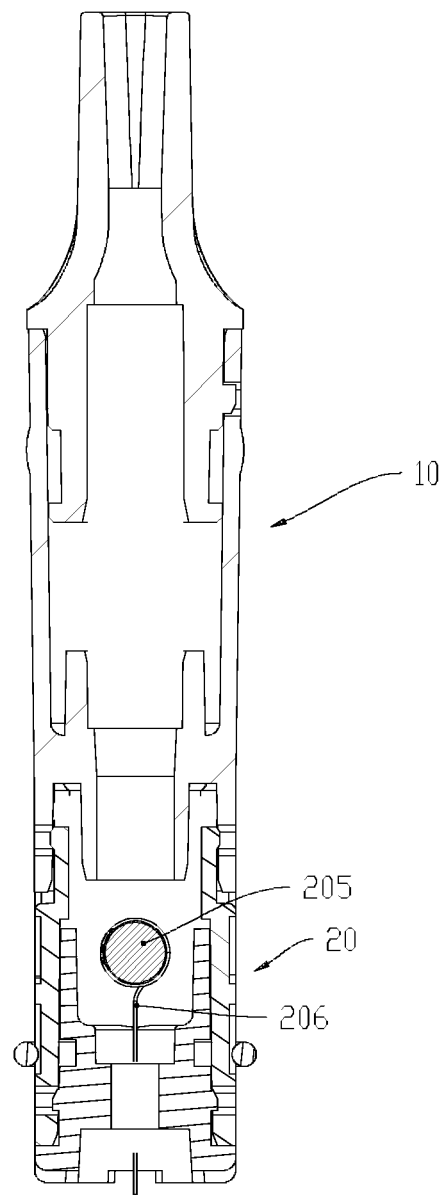
FIG. 2 is a first cross-sectional view of the present invention.
Figure 3:
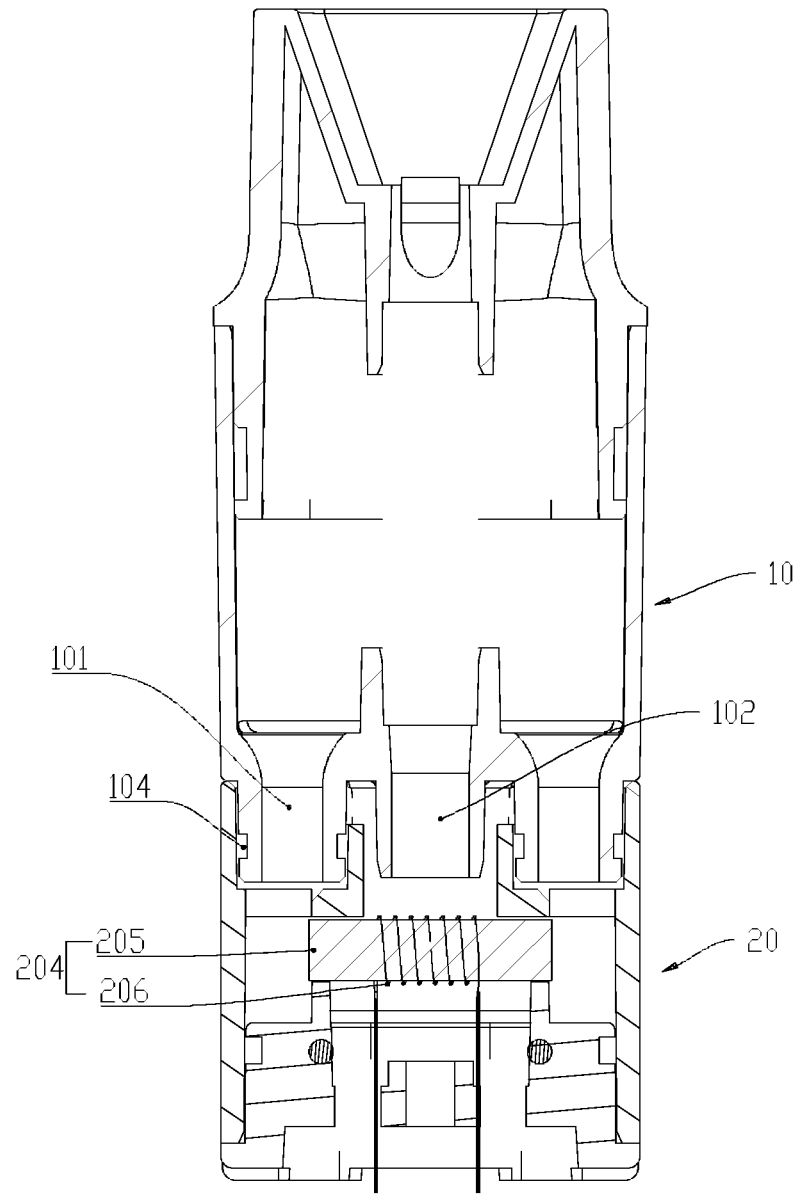
FIG. 3 is a second cross-sectional view of the present invention.
Figure 4:
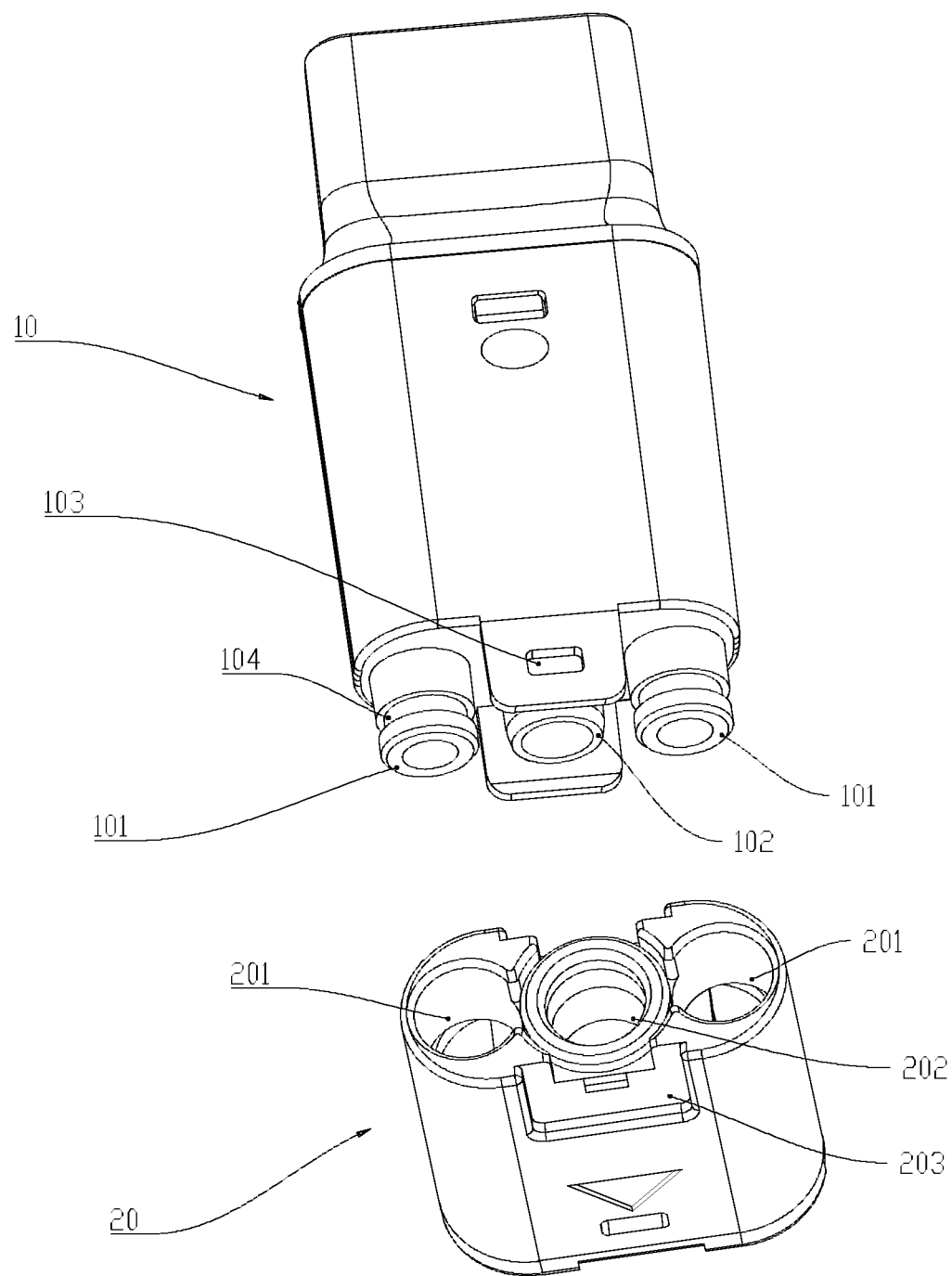
FIG. 4 is an exploded view of the present invention.

With reference to FIGS. 2 to 4, the external wall of the oil conduit 101 has a ring-shaped slot 104, and a sealing ring sheathed on the ring-shaped slot 104. There are two oil conduits 101 and one air conduit 102, and the two oil conduits 101 are symmetrically distributed with respect to the air conduit 102. The oil conduits 101 on both left and right sides are sheathed by the sealing rings to achieve the sealing effect to prevent oil leakage.

In FIGS. 3 and 4, the heating core support 20 has a heating element 204 installed transversally therein, and the heating element 204 includes an oil guide cotton 205, and a heating wire 206 sheathed on the oil guide cotton 205; and an end of the oil guide cotton 205 is engaged with a pipe opening of one of the oil conduits 101, and the other end of the oil guide cotton 205 is engaged with a pipe opening of the other oil conduit 101. The smoke oil in the oil storage compartment 10 is communicated with the oil guide cotton 205 through the left and right oil conduits 101 to achieve the oil guide effect. The middle air conduit 102 is provided for passing an air flow. The smoke oil in the oil storage compartment 10 enters into the heating core support 20 through the left and right oil conduits 101. When the smoke oil passes through the oil guide cotton 205, the heating wire 206 atomizes the smoke oil on the oil guide cotton 205. Since both sides of the oil guide cotton 205 are engaged with the respective pipe openings of the oil conduits 101 respectively, so that the smoke oil on the oil guide cotton 205 is distributed uniformly and atomized uniformly to improve the taste.

In FIGS. 3 and 4, the external wall of the oil storage compartment 10 has two latch buckles 103 symmetrically distributed with respect to the air conduit 102. The external wall of the heating core support 20 has two engaging slots 203 uniformly distributed with respect to the air guide hole 202. The two latch buckles 103 and the two engaging slots 203 can be engaged with the oil storage compartment 10 and the heating core support 20 to prevent the oil storage compartment 10 and the heating core support 20 from being loosened.

While the invention has been described by means of specific embodiments, numerous modifications and variations could be made thereto by those skilled in the art without departing from the scope and spirit of the invention set forth in the claims.

What is claimed is:

1. An atomizer compartment structure, comprising: an oil storage compartment and a heating core support, characterized in that the upper end of the oil storage compartment is a closed end, and the lower end of the oil storage compartment has a tubular oil conduit and an air conduit, and the external wall of the oil storage compartment has a latch buckle disposed at an end near the air conduit, and the upper end of the heating core support has an oil filling hole configured to be corresponsive to the oil conduit and an air guide hole configured to be corresponsive to the air conduit, and the external wall of the heating core support has an engaging slot for engaging with the latch buckle tightly, such that when the oil storage compartment and the heating core support are engaged tightly, the oil conduit extends into the oil filling hole, and the air conduit extends into the air guide hole.

2. The atomizer compartment structure of claim 1, wherein the oil conduit has a ring-shaped slot formed on the external wall of the oil conduit, and a sealing sheathed on the ring-shaped slot.

3. The atomizer compartment structure of claim 1, wherein the oil conduit comes with a quantity of two, and the air conduit comes with a quantity of one, and the two oil conduits are symmetrically distributed with respect to the air conduit.

4. The atomizer compartment structure of claim 3, wherein the heating core support has a heating element installed transversally therein, and the heating element includes an oil guide cotton, and a heating wire sheathed on the oil guide cotton; and an end of the oil guide cotton is coupled to a pipe opening of one of the oil conduits, and the other end of the oil guide cotton is coupled to a pipe opening of the other oil conduit.

5. The atomizer compartment structure of claim 1, wherein the oil storage compartment has two latch buckles disposed on the external wall thereof, and the two latch buckles are symmetrically distributed with respect to the air conduit; and the external wall of the heating core support has two engaging slots symmetrically distributed with respect to the air guide hole.

6. The atomizer compartment structure of claim 2, wherein the oil storage compartment has two latch buckles disposed on the external wall thereof, and the two latch buckles are symmetrically distributed with respect to the air conduit; and the external wall of the heating core support has two engaging slots symmetrically distributed with respect to the air guide hole.

7. The atomizer compartment structure of claim 3, wherein the oil storage compartment has two latch buckles disposed on the external wall thereof, and the two latch buckles are symmetrically distributed with respect to the air conduit; and the external wall of the heating core support has two engaging slots symmetrically distributed with respect to the air guide hole.

8. The atomizer compartment structure of claim 4, wherein the oil storage compartment has two latch buckles disposed on the external wall thereof, and the two latch buckles are symmetrically distributed with respect to the air conduit; and the external wall of the heating core support has two engaging slots symmetrically distributed with respect to the air guide hole.

* * * * *